US008694604B2

(12) United States Patent
Cummins et al.

(10) Patent No.: US 8,694,604 B2
(45) Date of Patent: Apr. 8, 2014

(54) ACCURATE SEARCH RESULTS WHILE HONORING CONTENT LIMITATIONS (75) Inventors: Charles E. Cummins, Seattle, WA (US); Justin Hamilton, Bellevue, WA (US); Yue Ma, Bellevue, WA (US); Hua Ding, Beijing (CN); Xiaowei Sheng, Beijing (CN); Bing Lang, Beijing (CN); Kun Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/217,549

(22) Filed: Aug. 25, 2011

(65) Prior Publication Data

US 2013/0054572 A1 Feb. 28, 2013

(51) Int. Cl.
*G06F 17/30* (2006.01)

(52) U.S. Cl.
USPC .......................................... 709/217; 709/225

(58) Field of Classification Search
USPC ................................................. 709/217, 225
See application file for complete search history.

(56) References Cited

U.S. PATENT DOCUMENTS

| 6,317,795 | B1* | 11/2001 | Malkin et al. ................... 709/246 |
| 6,769,009 | B1* | 7/2004 | Reisman ......................... 709/201 |
| 6,959,326 | B1* | 10/2005 | Day et al. ....................... 709/217 |
| 7,318,238 | B2 | 1/2008 | Elvanoglu et al. |
| 7,620,631 | B2* | 11/2009 | Paek et al. ............................ 1/1 |
| 7,630,986 | B1* | 12/2009 | Herz et al. ............................ 1/1 |
| 7,711,605 | B1 | 5/2010 | Santeufemia et al. |
| 7,725,875 | B2* | 5/2010 | Waldrep ........................ 717/106 |
| 7,801,158 | B2* | 9/2010 | Voit et al. ....................... 370/401 |
| 7,970,858 | B2* | 6/2011 | Adelman et al. ............... 709/217 |
| 7,975,150 | B1* | 7/2011 | Lillibridge et al. ........... 713/193 |
| 7,984,172 | B2* | 7/2011 | Wagner ......................... 709/230 |
| 2004/0261096 | A1 | 12/2004 | Matz |
| 2007/0056047 | A1 | 3/2007 | Claudator et al. |
| 2009/0128573 | A1 | 5/2009 | Lambe et al. |
| 2009/0204580 | A1 | 8/2009 | Seamon et al. |
| 2011/0107204 | A1* | 5/2011 | Cohen et al. ................... 715/243 |

OTHER PUBLICATIONS

"Content Advisor", Retrieved at <<http://technet.microsoft.com/en-us/library/dd361897.aspx>>, Retrieved Date: Apr. 20, 2011, pp. 8.
"Help / FAQ / Content filters", Retrieved at <<http://www.flickr.com/help/filters/>>, Retrieved Date: Apr. 20, 2011, pp. 4.

* cited by examiner

*Primary Examiner* — Kim Nguyen
(74) *Attorney, Agent, or Firm* — Dave Ream; Jim Ross; Micky Minhas (57) ABSTRACT

Accurate search results are provided while still honoring content limitations. Content responsive to search, whose presentation is prevented by content limitations is presented in an obscured manner, notifying the user of the existence of the content, while not enabling discerning of details, thereby honoring the content limitations. Attempted user interaction with obscured content acts as an entry point to changing the content limitations, including presenting user notifications of the content limitations and presenting an option to change the content limitations to allow for the unobscured presentation of the obscured content. Graphical content can be obscured by applying graphical modifications to generate new, obscured content that provides only a vague resemblance to the original, including jittering pixels, or other subcomponents, the applying of Gaussian blurs, and pixelization.

18 Claims, 5 Drawing Sheets

ACCURATE SEARCH RESULTS WHILE HONORING CONTENT LIMITATIONS

BACKGROUND

An ever increasing amount of information is available through computing devices that are communicationally coupled to one another through computer networks, such as the ubiquitous Internet and World Wide Web. Consequently, users increasingly turn to search engines to find the information for which they are seeking. As will be known by those skilled in the art, such search engines provide searching services whereby they compile indices of the information available through interconnected computing devices that are communicationally coupled to such search engines and then let users efficiently search for information that is relevant to a search query provided by that user to such a search engine.

As will also be recognized by those skilled in the art, a substantial amount of information that is available through interconnected computing devices can be information that may be inappropriate for certain users. For example, children utilizing a search engine should not be provided with access to sexual or violent imagery. Typically, search engines provide such filtering through "safesearch" mechanisms, where the strictness of a safesearch setting determines how much inappropriate content is provided in response to a search query.

Unfortunately, many users are often unaware of their safesearch settings, or that such settings even exist. In such a case, a user may have saved search settings set such that content for which that user is, in fact, actively searching for may not be allowed to be provided to that user under those safesearch settings. Such a user, unaware of their safesearch settings, may come to the mistaken conclusion that the content for which they are searching is either unavailable, or cannot be found by that particular search engine.

SUMMARY

In one embodiment, accurate search results can be provided to users while honoring content limitations, such as "safesearch" settings. Those search results that are found to be responsive to a user's query, but which are prohibited from being presented to the user by the user's safesearch settings, can be presented to the user in an obscured manner such that the user is notified of the existence of such responsive content while simultaneously respecting the user's safesearch settings.

In another embodiment, the obscured content presented to the user can act as an entry point into changing the user's safesearch settings to enable the user to be presented such content in an un-obscured manner. A user's selection of obscured content can cause the presentation of options to the user notifying the user of their safesearch settings and indicating that a change to those settings would need to be performed in order to enable the user to be presented such content in an unobscured manner. The user can also be presented with the option to change the safesearch settings directly through such a notification.

In a further embodiment, content that is responsive to the user's query can be presented in an obscured manner even if the user's safesearch settings would allow for the presentation of such content in an unobscured manner. In such an embodiment, the presentation of content in an obscured manner can be performed to avoid potential embarrassment, or other unintended consequences, to the user, or to accommodate for user search queries to which certain, potentially objectionable, content can be responsive, but which may not have been intended by the user.

In a still further embodiment, graphical content can be obscured by applying graphical operations to such graphical content to generate new, obscured content that provides only a vague resemblance to the original graphical content, thereby enabling a user to recognize that content prohibited by that user's current safesearch settings has been found to be responsive to the user's search query, but yet still preventing the user from accurately discerning such graphical content, thereby honoring the user's current safesearch settings. Such applied graphical operations can include the jittering of pixels, or other subcomponents, of the graphical content, the application of a Gaussian blur, or other blurring effects, the pixelization of the graphical content, or other like graphical operations that graphically obscure graphical content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the provision of accurate search results while honoring content limitations. When content is responsive to a user's search, but the presentation of that responsive content has been limited, the response of content can be presented in an obscured manner, notifying the user of its existence, while also not enabling the user to discern such content and, thereby, honoring the content limitations. Attempted user interaction with the obscured content can act as an entry point to changing the existing content limitations, including by presenting the user with a notification of the existing content limitations and by presenting the user with an option to change the existing content limitations to allow for the unobscured presentation of the obscured content. Graphical content can be obscured by applying graphical operations to such graphical content to generate new, obscured content that provides only a vague resemblance to the original graphical content. Such applied graphical operations can include the jittering of pixels, or other subcomponents, of the graphical content, the application of a Gaussian blur, or other blurring effects, the pixelization of the graphical content, or other like graphical operations that graphically obscure graphical content.

For purposes of illustration, the techniques described herein make reference to existing and known networking infrastructure, such as the ubiquitous Internet and World Wide Web (WWW). Also for purposes of illustration, the techniques described herein make reference to existing and known protocols and languages, such as the ubiquitous HyperText Transfer Protocol (HTTP) and the equally ubiquitous HyperText Markup Language (HTML) and the Cascading Style Sheets (CSS) stylesheet language. Such references, however, are strictly exemplary and are not intended to limit the mechanisms described to the specific examples provided. Indeed, the techniques described are applicable to any environment and language within which one or more containers can be established and linked so as to define the flow of an independent collection of content through them.

Additionally, for purposes of illustration, the techniques described herein are described within the context of existing content limitation mechanisms implemented by existing Internet and WWW search engines, namely the "safesearch" mechanisms that control the amount of adult content, most notably sexual content in the form of images, still frames from videos and other graphical content, that is presented in response to a user search query. However, the techniques described are applicable to any sort of content limitations and to any sort of content. For example, the techniques described herein are equally applicable to content limitations directed to content directed to violence or violent topics, content having a particular political or religious context, or any other category of content to which access may wish to be selectively curtailed. Similarly, the techniques described herein are equally applicable to any type of content, and not just graphical content, including textual content, and hypermedia and multimedia content.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Figure 1:
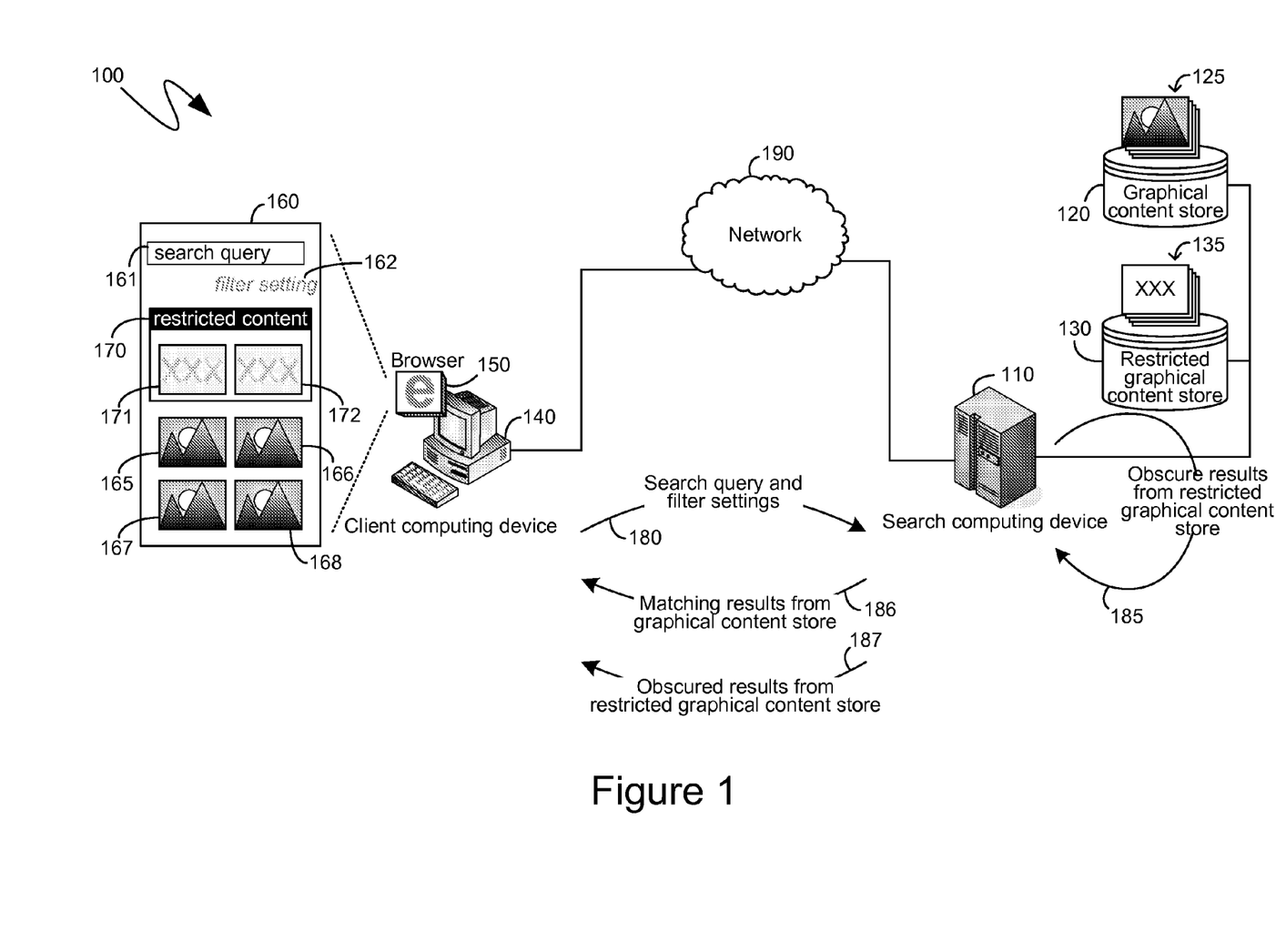
FIG. 1 is a block diagram of an exemplary provision of accurate search results while honoring content limitations.

Turning to FIG. 1, an exemplary system 100 is shown, comprising a computing device 140 that can access content, over the network 190, such as with a network browser application program 150 that can execute, in a known manner, on the computing device 140. A server computing device 110 is shown as being communicationally coupled to the network 190 such that it can provide content to the network browser application program 150 executing on the computing device 140 that is, likewise, communicationally coupled to the network 190. More specifically, the server computing device 110 can provide search functionality to the user of the computing device 140, such as through the browser 150. The user of the computing device 140 can provide a search query to the search computing device 110, through the browser 150, and can receive, from the search computing device 110, or, more accurately, from search processes executing on the search computing device 110, information and content that has been deemed, by the processes executing on the search computing device 110 to be responsive to the search query. As will be recognized by those skilled in the art, the responsive information and content can reference information and content provided by other computing devices that are communicationally coupled with the computing device 140 via the network 190.

Typically, to efficiently provide such search functionality, processes executing on one or more search computing devices, such as the search computing device 110, can obtain information and content made available by other computing devices communicationally coupled to the network 190 and can index such information and content. For purposes of the descriptions below, which, as indicated previously, are provided within the context of existing Internet and WWW search engines that provide filtering of graphical sexual content, the graphical content indexed by the processes executing on one or more search computing devices can comprise graphics 125 that can be part of a graphical content store 120 and restricted graphics 135 that can be part of a restricted graphical content store 130. The graphical content store 120 and restricted graphical content store 130 can be communicationally coupled with one or more search computing devices, such as the search computing device 110, such that, upon receiving a user query, processes executing on the search computing device 110 can quickly and efficiently reference the graphical content store 120 and the restricted graphical content store 130, if appropriate, and determined therefrom whether computing devices communicationally coupled to the network 190 provide graphical content, including restricted graphical content, that is responsive to the received user query.

As utilized herein, the term "restricted graphical content" refers to any content in the form of a graphic, including image content, video content, image content derived from video content, and other like content, whose subject matter can be filtered out, or restricted by, content limitation mechanisms associated with the search services provided by, for example, the search computing device 110. Thus, since, as will be recognized by those skilled in the art, existing Internet and WWW search engines provide "safesearch" functionality that provides the filtering of graphical sexual content, the term "restricted graphical content" means, in that context, graphical content having a sexual component such as pornographic images, videos, images derived from videos, and other like graphical sexual content. However, as indicated previously, the mechanisms described herein are not limited to the filtering of sexual content and can apply to the filtering of content having violent, political, religious, or other like contexts to which access may seek to be selectively limited. In those embodiments, the term "restricted graphical content" means content having, respectively, a violent aspect, a political component, a religious component, and the like.

The mechanisms by which content is divided into, for example, the graphics 125 and the restricted graphics 135 are orthogonal to the mechanisms described below. As will be recognized by those skilled in the art, many strategies and mechanisms exist for identifying, for example, graphical sexual content, such as pornographic images and videos, including, for example, analyzing the percentage of flesh colors that appear in images or videos, analyzing the source of images and videos, analyzing tags or other metadata associated with images or videos, and other like strategies and mechanisms. Any or all of those mechanisms can be applied to divide graphical content made available via the network 190 into the graphics 125 and the restricted graphics 135. Thus, for purposes of the descriptions below, it is assumed that a determination has already been made as to which content is "restricted graphical content", namely the restricted graphics 135 stored in the restricted graphical content store 130, and which content is not, namely the graphics 125 that are stored in the graphical content store 120. Instead, the descriptions below are directed to mechanisms for presenting such content, to the extent that it is responsive to a user's search query, in order to provide that user with accurate search results, while at the same time honoring that user's content limitations by not presenting such restricted graphical content in an unobscured manner if the user's content limitations do not provide for the presentation of such restricted graphical content.

More specifically, and as is shown by the system 100 of FIG. 1, restricted graphical content, such as one or more of the restricted graphics 135, that may be responsive to a user's query can still be provided to that user, while honoring that user's content limitations that prevent the presentation of such restricted graphical content, by first obscuring the filter graphical content in such a way that the obscured restricted graphical content does not show that which the user's content limitations prevent. More specifically, the obscuring of graphical content can render unrecognizable those aspects of that graphical content that are being restricted out, thereby allowing the obscured graphical content to be presented to the user while continuing to honor that user's content limitations. For example, within the specific context of currently implemented safesearch mechanisms, which filter content based on the quantity and nature of sexual images provided therein, an image of one or more humans engaged in a sexual act can be obscured such that the obscured image can vaguely depict a humanoid form without any further detail being distinguishable. Such an obscured image cannot be considered an image having sexual content because it lacks sufficient detail from which to discern that it is an image of one or more humans engaged in a sexual act. Consequently, such obscured image could be presented to a user even though that user's safesearch settings can be set to a "medium" setting that would prevent the presentation of the original image of the one or more humans engaged in the sexual act.

From the perspective of a user receiving such an obscured image in response to a search query, a user that was not specifically searching for something sexual can recognize the obscured image as originally having been an image that must have presented something sexual in order for it to have been obscured and, consequently, can ignore the obscured image since the user was not specifically searching for something sexual. Conversely, a user that was specifically searching for something sexual can utilize the presentation of the obscured image as an entry point or trigger mechanism through which to initiate the changing of that user's safesearch settings so as to enable the user to find that for which they were specifically searching. In such a manner, users can be informed of the existence of content that can be responsive to their query while still honoring the content limitations of those users.

Such functionality can be useful in conveying to users the capabilities of the search computing device 110 and, more specifically, of the search computer-executable instructions being executed by that computing device. More specifically, users often forget, or may not even be aware of, the existence of content limitation settings that are being applied to the information presented to those users in response to their search queries. Consequently, users specifically searching for the sort of content that is prevented by their content limitation settings may not be aware that their content limitation settings are currently set in such a manner, or may have forgotten to change their content limitation settings prior to entering their search query. Such users, upon receiving information from the search computing device 110 that is deemed to be responsive to their search query but that does not include the content that those users' content limitation settings prevent, can conclude that the search computing device 110, and the computer-executable instructions executing thereon, are simply incapable of finding that for which those users are searching. By providing obscured content that, by virtue of its obscured state, still honors those users' content limitation settings, the search computing device 110, and the computer-executable instructions executing thereon, can provide notification to those users that the content for which they are searching can be found by the search computing device 110, and the computer-executable instructions executing thereon, except that those users' content limitation settings currently prevent the presentation of that content, to those users, in an unobscured form. Additionally, as indicated previously, the obscured content can serve as an entry point through which those users can be prompted to, or can be helped to, change their content limitation settings, should they desire to do so.

Thus, as illustrated by the system 100 of FIG. 1, a user of the client computing device 140, utilizing the browser 150, can enter a search query that, along with that user's content limitation settings, can be communicated to the search computing device 110, via the network 190, as illustrated by the communication 180. The computer-executable instructions executing on the search computing device 110 can analyze the search query, received via the communication 180, and determine appropriate search strategies including, for example, whether to search the graphical content store 120 and the restricted graphical content store 130. If the search query received from the user of the client computing device 140, via the communication 180, triggers a searching of the restricted graphical content store 130 and if the searching of that restricted graphical content store 130 results in the finding of restricted graphical content that is responsive to that search query, the computer-executable instructions executing on the search computing device 110 can proceed to obscure the results that were found in the restricted graphical content store 130, if the filter settings, also received via the communication 180, are such that the results that were found in the restricted graphical content store 130 could not be presented in their original form. Such an obscuring is illustrated by the processing 185 that is performed by the computer-executable instructions executing on the search computing device 110.

The search computing device 110 can then return, to the browser 150 executing on the client computing device 140, content that the search computing device 110 is deemed to be responsive to the search query that the user of the client computing device 140 entered into the browser 150. Such responsive content can include matching results from the graphical content store 120, which can be provided to the browser 150 via the communication 186. Such response of content can also include matching results from the restricted graphical content store 130 that can have been obscured by the processing 185, which are shown as being provided to the browser 150 via a separate communication 187 for purposes of illustration only since, as will be recognized by those skilled in the art, communications 186 and 187 are likely to be part of a single transmission from search computing device 110 to the browser 150 executing on the client computing device 140.

In one embodiment, the browser 150, executing on the client computing device 140, can generate a user interface analogous to the user interface 160 illustrated the system 100 of FIG. 1. As illustrated, the exemplary user interface 160 can comprise a search query entry box 161 to enable the user to enter a search query, as well as a filter setting 162 to enable the user to adjust the level of content filtering that is applied to the content found to be responsive to the search query entered through the search query entry box 161. As indicated previously, the filter setting 162 is often ignored by users, or users are not aware of its existence, or its purpose and operation. The exemplary user interface 160 can further comprise content that has been found to be responsive to the search query entered in the search query entry box 161. For example, the images 165, 166, 167 and 168 can be images that are available from computing devices communicationally coupled to the network 190 and that have been found to be responsive to the search query by the computer-executable instructions executing on the search computing device 110.

If the filter setting 162 is set such that it prevents the presentation of certain content found by the search computing device 110 to be responsive to the search query entered into the search query entry box 161, the search computing device 110 can present that content in an obscured fashion so as to honor the content limitations imposed by the filter setting 162. In one embodiment, a restricted content area 170 can be part of the exemplary user interface 160 thereby notifying the user that content was found that is responsive to that user's search query but which is not allowed to be presented to the user in an unobscured manner due to the filter setting 162. The restricted content area 170 can comprise at least some of the content found to be responsive to the user's search query that has been obscured by the computer-executable instructions executing on the search computing device 110. For example, the restricted content area 170 can comprise obscured images 171 and 172 that can be obscured versions of images that were part of the restricted graphics 135, stored in the restricted graphical content store 130, in that were found to be responsive to the user's query.

In one embodiment, the obscuring of content, specifically graphical content, can be performed by applying one or more graphical operations to the graphical content so as to eliminate details from the graphical content, thereby enabling the obscured content to be presented while still honoring the content limitation settings, such as for the reasons described in detail below. One example of a graphical operation that can be applied to graphical content to obscure it can be the well-known Gaussian blur which, as will be recognized by those skilled in the art, can decrease the details in an image by blurring the image. Additionally, as will also be recognized by those skilled in the art, the amount of blurring and detailed loss achieved by the Gaussian blur can be controlled by adjusting the blur radii accordingly. Another example of the graphical operation that can be applied to graphical content to obscure it can be the well-known pixelization operation, whereby components of an image, such as a collection of pixels, are reduced to a single value, such as a single color. Typically, the single value that is selected to represent the components of the image is a value based on those components. For example, the single color assigned to a group of pixels during a pixelization operation can be an average color of those pixels, or can be a representative color selected from among one of those pixels.

In another embodiment, the obscuring of graphical content can be performed so as to evoke known visual cues, such as by obscuring the graphical content such that it appears as if the graphical content is being viewed through frosted glass, or other like known visual obscuring device. In such an embodiment, such a "frosted glass" effect can be achieved by first generating a "glass effect", such as by adjusting the alpha value of each pixel in the graphical content so as to change the color of that pixel to make it appear as if that pixel is being viewed through glass. Subsequently, a jitter effect can be added by selecting each pixel, or a representative set of pixels, in the graphical content, and then randomly changing the position of each one of the selected pixels. Such a jitter effect can "shake" the image at a pixel level. Combined with the adjustment of the alpha value, the addition of the jitter effect can obscure graphical content, such as an image, by making it appear as if that image is being viewed through a pane of frosted glass such that only the most basic and fundamental aspects of such an image can be discerned and little, or none, of the details of that image can be discerned.

Figure 2:
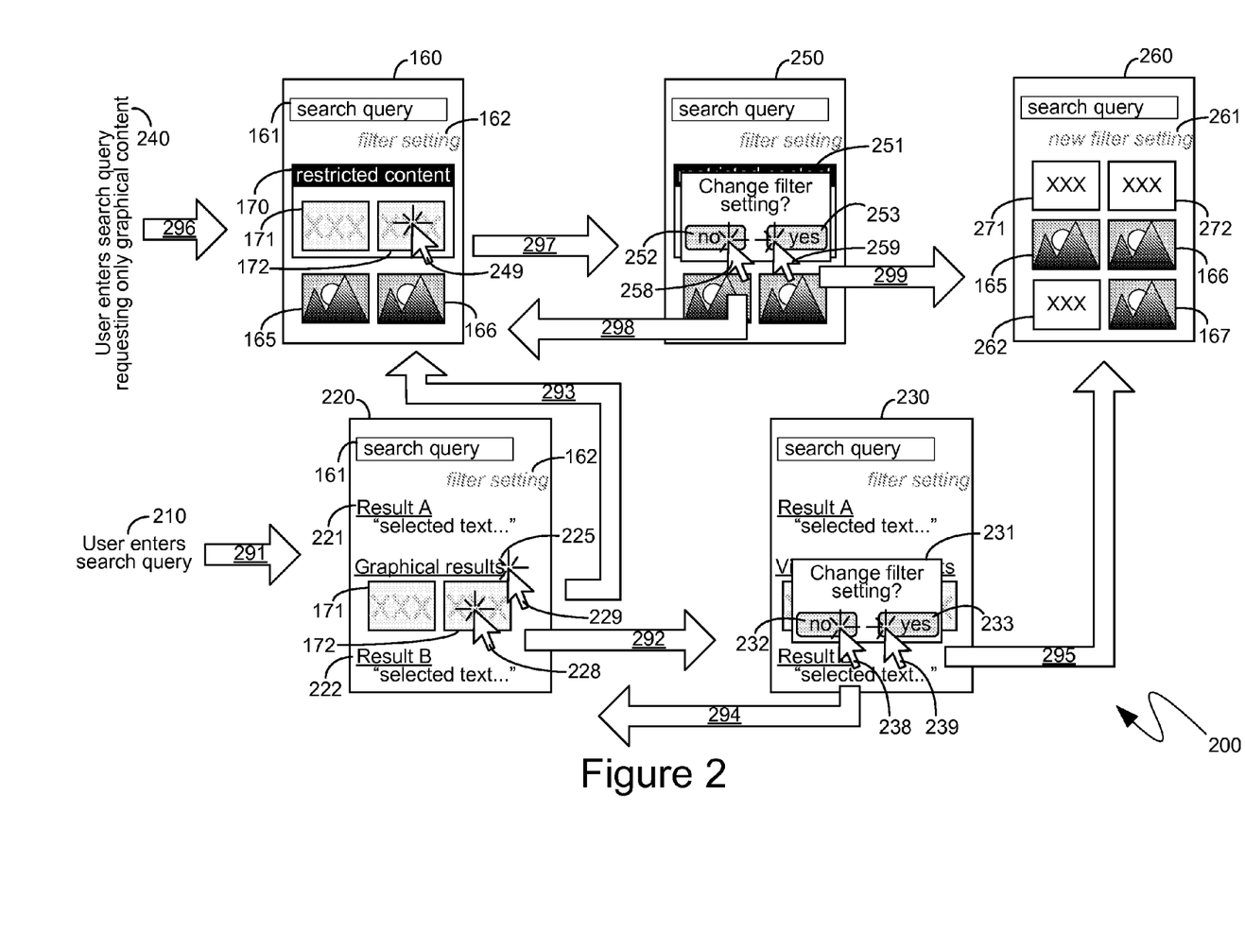
FIG. 2 is a block diagram of an exemplary sequence of user interfaces and interactions associated with the provision of accurate search results while honoring content limitations.

As indicated previously, the presentation of the restricted content in an obscured form, such as in the restricted content area 170, can act as an entry point to enable the user to change their filter settings 162 should they desire to do so. Turning to FIG. 2, the system 200 shown therein illustrates an exemplary series of user interfaces and interactions by which the presentation of restricted content in an obscured form can act as an entry point to aid the user in understanding and changing their filter settings.

Initially, as illustrated by the action 210, the user can enter a search query. In response to the user's entry of the search query at action 210, an exemplary user interface 220 can be presented, as illustrated by the arrow 291. In one embodiment, the exemplary user interface 220 can comprise the search query entry box 161 and the filter setting 162 described above. Additionally, in such an embodiment, the exemplary user interface 220 can further comprise content that can have been found to be responsive to the query that was entered by the user at the action 210, including both graphical content and other hypermedia content, including links to such hypermedia content. For example, the exemplary user interface 220 can comprise an indication of responsive content 221 that can comprise both a link to that responsive content and a quoted, selected portion of that responsive content to enable the user to make at least an initial assessment of the response of content without having to follow the link and load all of that content for themselves. Similarly, the exemplary user interface 220 can comprise another indication of a different response of contents 222 that can, like the indication responsive content 221, also comprise both the link to that response of content and a quoted, selected portion of that responsive content.

In addition, the exemplary user interface 220 can comprise a section where graphical content that was found to be responsive to the user's search query can be presented to the user. More specifically, modern search engines often enable a user to limit their searches to specific types of content, such as pictures, videos, newsgroup postings, blog posts, research publications, court documents, or other like specifications of content. Additionally, as will be known by those skilled in the yard, such modern search engines typically present such content to the user through different interfaces. Thus, for example, graphical content, such as pictures and still frames from videos, can be presented to the user through a different user interface than, for example, content such as research publications or court documents. Typically, such subsets of content can be accessed through a main interface that can provide links to other interfaces that are specific to defined subsets of content. In one embodiment, the exemplary user interface 220 can represent such a main interface and can comprise links to other interfaces. For example, the exemplary user interface 220 can comprise a link 225 to a different user interface specifically directed to the provision of only graphical results, such as images, videos, still images from videos, and other like graphical elements, that have been found to be responsive to the user's search query. Additionally, co-located with the link 225 can be some graphical results that have been found to be responsive to the user's search query. In the specific exemplary user interface 220 the sample graphical results that are provided can include the obscured images 171 and 172 that were described previously.

In one embodiment, if a user were to direct a user action to one of the obscured graphical results, such as the obscured images 171 and 172, the user can be provided with information indicating why the images 171 and 172 are obscured, and can be provided with an option to change the current content filtering that requires such images to be obscured, thereby enabling the presentation of those obscured graphical results to act as an entry point by which the user can be aided in modifying their content filtering settings. More specifically, and as illustrated by the system 200 of FIG. 2, if a user were to perform a click 228 on the obscured image 172, or direct an analogous user action to the obscured image 172, a new exemplary user interface 230 can be presented, as illustrated by the arrow 292.

The new exemplary user interface 230 can comprise the same elements as the exemplary user interface 220, except that it can further comprise a notification, such as the pop-up area 231, that is illustrated as being superimposed over the other elements that were previously in the exemplary user interface 220. In one embodiment, the area 231 can comprise notification to the user explaining why the graphical results, such as the images 171 and 172, have been obscured. For example, the area 231 can comprise an explanation to the user that there exist content limitations, in the form of the filter settings 162, that are currently set such that the content of the original images, from which the obscured images 171 and 172 were derived, is prohibited from being presented to the user. Additionally, the area 231 can further comprise an option for the user to select to change content limitations, in particular so as to be able to view the original images from which the obscured images 171 and 172 were derived. Thus, as illustrated in the exemplary user interface 230, the area 231 can comprise an option 232 that the user can select to retain the current content limitations and an option 233 that the user can select to change the content limitations and enable the user to view the original images from which the obscured images 171 and 172 were derived.

If the user were to select the option 232 to retain the current content limitations, such as is illustrated by the user click 238, then the user can be presented again with the exemplary user interface 220, where the graphical results, such as the images 171 and 172, can continue to be displayed in an obscured manner. Such a return to the exemplary user interface 220 is illustrated by the arrow 294 proceeding from the click 238. Conversely, if the user were to select the option 233, such as is illustrated by the user click 239, then the user can be presented with the exemplary user interface 260, as illustrated by the arrow 295 proceeding from the click 239.

In one embodiment, the exemplary user interface 260 can be an exemplary interface associated with the presentation of content, found to be responsive to the user's search query, that is on the specific type, or subset. In the specific example illustrated by the system 200 of FIG. 2, the exemplary user interface 260 can be an exemplary interface for the presentation of graphical content found to be responsive to the user's search query, including images, videos, still images from videos, and other like graphical content. Thus, as shown by the system 200 of FIG. 2, the exemplary user interface 260 can comprise the images 165, 166 and 167 that were described previously. In addition, because the exemplary user interface 260 can represent a user interface that would be presented to a user after the user had agreed to change the settings of any content limitations that may be applied such that restricted graphical content could be presented in an unobscured manner, the exemplary user interface 260 can further comprise unobscured restricted graphical content, such as the images 271 and 272, which can represent unobscured versions of the obscured images 171 and 172 described previously. The exemplary user interface 260 can comprise other unobscured filter graphical content, such as the image 262. In addition, the filter setting 261 can represent the new filter setting, having been changed from the filter setting 162 by, in this example, the user click 239.

In another embodiment, rather than entering the search query, as illustrated by the action 210, such that the user receives amalgamated search results comprising results of varying types and subsets, the user can enter their search query in such a manner to specify only a particular type or subset of content to be searched, such as, for example, specifying only graphical content researched. The system 200 of FIG. 2 illustrates a user action 240 whereby the user can enter their search query and specify that only graphical content be searched. As illustrated by the arrow 296, such a user action 240 can present the previously described exemplary user interface 160 that was originally shown in FIG. 1. As indicated previously, such an exemplary user interface 160 can comprise both content, such as the images 165 and 166, and restricted content, such as the content presented within the restricted content area 170.

Turning back to the exemplary user interface 220 if, rather than performing the user click 228 on a particular graphical result, such as the obscured image 172, and thereby initiating the sequence described in detail above, the user instead performed a user click 229 on the graphical results link 225, the user could be presented with the exemplary user interface 160 in the same manner as if the user had initially specified that only graphical content be searched, such as via the user action 240. The arrow 293, proceeding from the user click 229, illustrates such an embodiment.

Turning back, then, to the exemplary user interface 160, whether presented as a result of the user action 240, or as a result of the user click 229 within the context of the previously presented exemplary user interface 220, if the user were to subsequently select content from the restricted content area 170, such as, for example, by performing the user click 249 on the obscured image 172, the user could be presented with an exemplary user interface 250. In one embodiment, the exemplary user interface 250, that is presented in response to the user click 249 on the obscured image 172 in the exemplary user interface 160, can be analogous to the previously described exemplary user interface 230. More specifically, the exemplary user interface 250, like the previously described simpler user interface 230, can comprise a pop-up area, namely the pop-up area 251, that can be analogous to the pop-up area 231, in that the pop-up area 251 can be presented over the elements that were previously presented in the exemplary user interface 160. The arrow 297 illustrates the presentation of the exemplary user interface 250 in response to the user click 249.

As described with reference to the pop-up area 231, the pop-up area 251 can, likewise, provide the user with information regarding their content limitation settings which require the presentation of restricted content in an obscured manner and can enable the user to select to change those content limitation settings. For example, the exemplary pop-up area 251 comprises a selection 252 that can retain the current content limitation settings and a selection 253 that can change the content limitation settings such that the restricted content can be presented in an unobscured manner. If the user selects the selection 252, such as via the user click 258, then the user can again be presented with the exemplary user interface 160, as illustrated by the arrow 298. Conversely, if the user selects the selection 253, such as via the user click 259, the content limitation settings can be changed to allow for the presentation of the restricted content in an unobscured manner and, as such, the user can be presented with the exemplary user interface 260, which, as described in detail above, displays the restricted content, such as the images 271 and 272, in an unobscured manner. The arrow 299 can illustrate the presentation of the exemplary user interface 260 in response to the user click 259 in the exemplary user interface 250.

Figure 3:
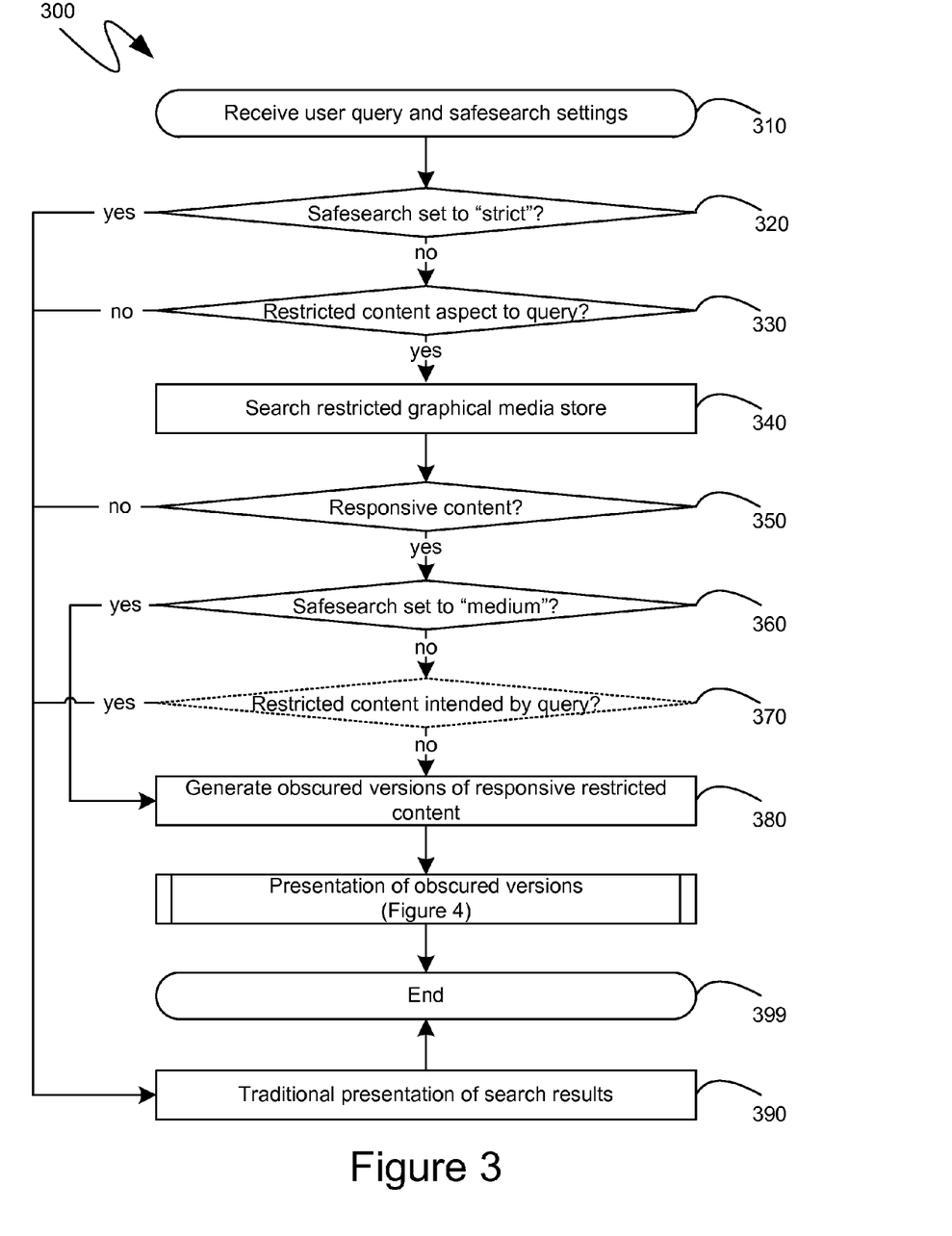
FIG. 3 is a flow diagram of an exemplary provision of accurate search results while honoring content limitations.

Turning to FIG. 3, the flow diagram 300 illustrates an exemplary series of steps that can be performed, such as by a search computing device, to provide for the above described mechanisms. Initially, as illustrated, at step 310, a user's query and the content limitation settings, such as "safesearch" settings can be received. At step 320, an initial determination can be made regarding the precise content limitation settings that are applicable and that were received at step 310. More specifically, if the content limitation settings are set such that absolutely no restricted content is to be provided in response to the user's query, then even obscured restricted content cannot be provided and, as such, there is no need to generate or present such obscured restricted content. Thus, if, at step 320, it is determined that the content limitation settings are set so as to limit the greatest amount of content, then processing can skip to step 390 where content responsive to the user query that was received at step 310 can be determined and presented to such a user in a traditional manner. The processing can then end at step 399.

However, if, at step 320, the initial determination reveals that the content limitation settings are not set to their most stringent settings, then processing can proceed to step 330 at which point a determination can be made as to whether the user's query that was received at step 310 is such that restricted content may be responsive to such a query. The determination at step 330 can be performed, in one embodiment, by a "classifier" that can evaluate the user's query that was received at step 310 based on the semantics of that query. In such an embodiment, the classifier can assign one or more values, or "scores", to the query that was received at step 310 to quantify various semantical aspects of that query including a quantification of the restricted content aspect of the query. For example, in the specific example referenced previously, where the content limitation settings are directed to sexual, or pornographic, content, the classifier can assign a score to the query that was received at step 310 quantifying the degree to which that query has a sexual, or pornographic, aspect. To illustrate, a query comprising the name of a pornographic actress may be assigned one score to quantify the degree to which that query has a sexual aspect while another query directed specifically to videos of that pornographic actress may be assigned a higher score because the first query can also be an attempt to search for non-pornographic information including, for example, a biography of the pornographic actress, books written by or about a pornographic actress or other like non-pornographic information that would be responsive to a user query comprising that pornographic actress's name, while the second query would be less likely to be an attempt to search for non-pornographic information and, as such, would be assigned the higher score. In one embodiment, the determination, at step 330, can be made with reference to such scores that can be assigned to the query, which was received at step 310, by the classifier. Specifically, in such an embodiment, the score assigned to the query can be compared to a threshold value such that queries assigned scores that are higher than the threshold value can be considered to have a restricted content aspect to them, and processing can proceed with step 340, while those queries assigned scores that are lower than the threshold value can be considered to not have a restricted content aspect to them, and processing can proceed with step 390 and then end at step 399.

As would be understood by those skilled in the art, if a query is found, at step 330, to not have a restricted content aspect to it, then there would be no need to search the restricted content or present it to the user, whether obscured or not, since the determination, at step 330, can, in essence, be a determination that restricted content is not likely to be responsive to the query that was received at step 310. Consequently, if, at step 330, it is determined that there is no restricted content aspect to the query that was received at step 310, processing can proceed with step 390 at which point information responsive to the user query can be obtained and presented to the user in the traditional manner. The processing can then end at step 399. On the other hand, if, at step 330, it is determined that there is a restricted content aspect of the query, then processing can proceed with step 340 where the restricted content, such as the restricted graphical media store, can be searched for content that is responsive to the user query that was received at step 310.

After searching the restricted content at step 340, processing can proceed to step 350 where a determination can be made as to whether any restricted content was found, at step 340, to be responsive to the user query that was received at step 310. If, at step 350, it is determined that no responsive content was found, at step 340, among the restricted content, then there is no restricted content to be presented to the user and processing can proceed with step 390, as described previously, and can then end at step 399. If, on the other hand, at step 350, it is determined that responsive content was found, at step 340, among the restricted content, then processing can proceed to step 360 where the content limitation settings can be further evaluated. More specifically, at step 360, a determination can be made as to whether the restricted content that was found, at step 340, to be responsive to the user query that was received at step 310 is allowed to be presented to the user based upon the current content limitation settings, that were also received at step 310.

If, at step 360, it is determined that the restricted content that was found to be responsive to the user query is not allowed to be presented to the user, processing can proceed to step 380, at which point obscured versions of the responsive restricted content, that was found at step 340, can be generated. As indicated previously, the generation of the obscured versions of the responsive restricted content, at step 380, can generate restricted content, especially graphical restricted content such as images, videos, still images from videos, and other like graphical content, that lack sufficient detail to convey those aspects of the original graphical content that caused it to be considered restricted graphical content under the current content limitation settings. For example, within the specific example of content limitation settings that prevent the presentation of sexual, or pornographic, content, the obscured versions that can be generated at step 380 can be sufficiently blurred, or otherwise obscured, that only vaguely humanoid forms, if that, may be distinguished and otherwise no, or only a very minimal, sexual or pornographic aspect can be distinguished. The obscured versions of the responses restricted content that are generated at step 380 can then be presented in accordance with the steps of the flow diagram 400 of FIG. 4, to be described in further detail below. The relevant processing can then end at step 399.

If, at step 360, it is determined that the content limitation settings would allow the presentation of the restricted content that was found, at step 340, to be responsive, an optional step 370 can be performed to determine whether the restricted content was intended by the query. In one embodiment, the determination, at step 370, can be based on the same score assigned to the query by a classifier that was also utilized at step 330. However, while step 330 merely determined whether the query had a restricted content aspect to it, so as to determine whether to search the restricted content in the first place, step 370 can determine whether the query was specifically directed to restricted content. As such, the determination, at step 370, when referencing the score assigned to the query by a classifier, can utilize a higher threshold than the threshold utilized by step 330. If, at step 370, it is determined that restricted content was, in fact, intended by the query, then processing can proceed to step 390 since step 360 already determined that the content limitation settings were such that the restricted content would be allowed to be presented in an unobscured form. Conversely, if, at step 370, it is determined that restricted content was not intended by the query, then processing can proceed to step 380 to generate obscure versions of the responsive restricted content since, in such an optional embodiment, the obscured versions of responsive restricted content can be presented even if the content limitation settings would have allowed unobscured versions thereof, to avoid presenting possibly objectionable content to the user when the user may not, in fact, have been searching for such content. Step 370 is illustrated via dashed lines in the flow diagram 300 of FIG. 3 to illustrate that it is an optional step.

Figure 4:
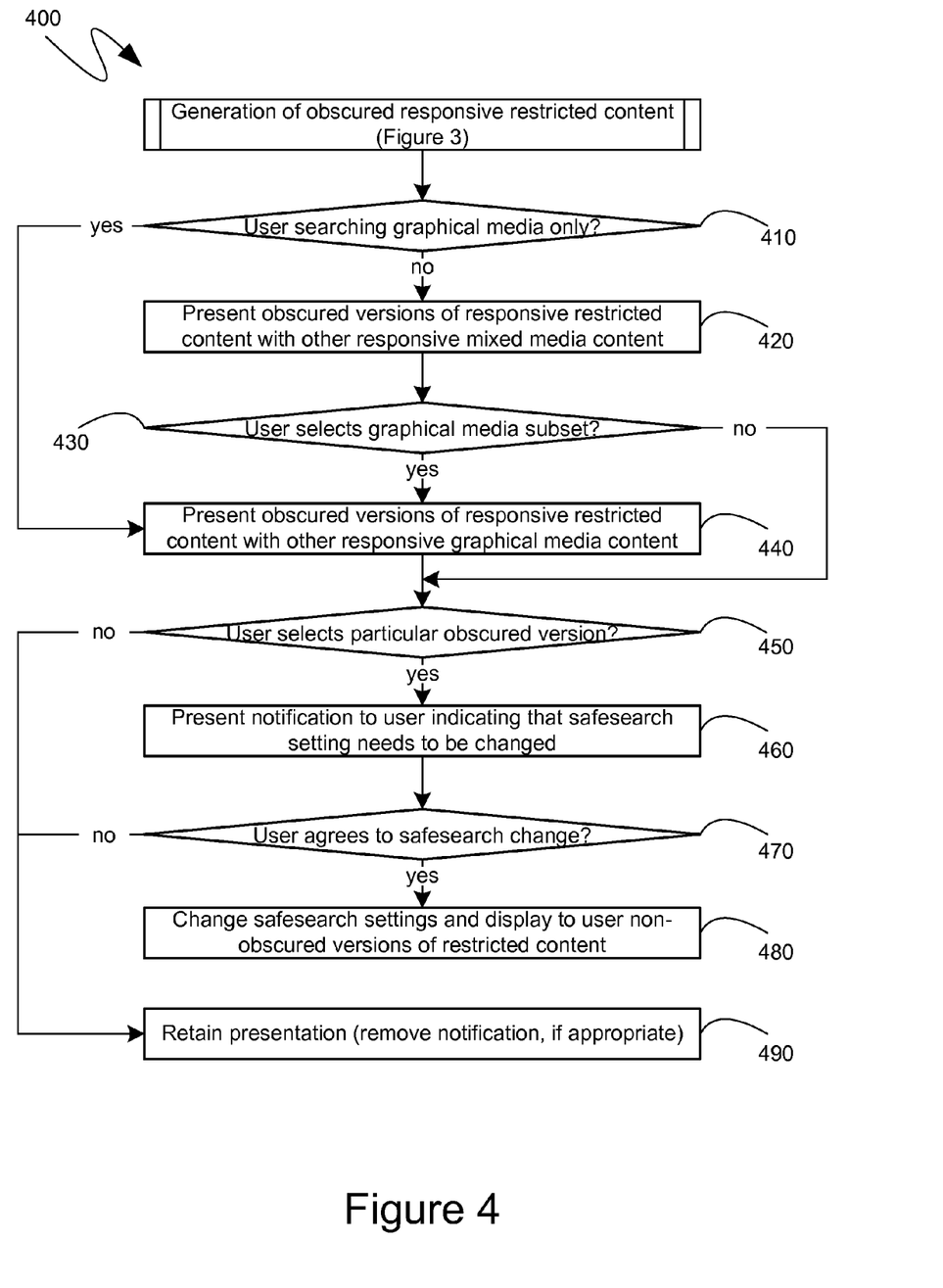
FIG. 4 is a flow diagram of another aspect of an exemplary provision of accurate search results while honoring content limitations.

Turning to FIG. 4, the flow diagram 400 shown therein illustrates an exemplary series of steps that can be performed to provide for the presentation of the obscured responsive restricted content that was generated at step 380 of the flow diagram 300 shown in FIG. 3 and described in detail above. Initially, as can be seen from the flow diagram 400 of FIG. 4, at step 410, a determination can be made as to whether the user was only searching graphical media. As indicated previously, different user interfaces can be presented to the user to enable the user to specify searches within specific types, or subsets, of content, such as specifying a search for graphical content, news content, blog content, discussion forum content, and other like types and subsets of content. If the user was not specifically searching only for graphical media, as determined at step 410, then the results that can be presented to the user, of the content found to be responsive to the user query that was received, can include both the obscured versions of the responsive restricted content as well as other responsive content irrespective of its type or subset. Thus, at step 420, the user can be presented with mixed-media content that has been found to be responsive to the user's query including, for example, links to responsive hypermedia content, as well as responsive graphical content. Subsequently, at step 430, the user can specify, from among the types and subsets of content that were presented at step 420, a particular subset, specifically the graphical media subset. If the user indicates an intention to receive and peruse only graphical media that have been found to be responsive, processing can proceed with step 440 where the obscure versions of responses restricted content can be presented with other responsive graphical media content. Returning back to step 410, if, conversely, it is determined, at step 410, that the user was, in fact, only searching for graphical media, then processing can proceed directly to step 440.

At step 450, a determination can be made as to whether the user selects one of the obscured versions of responsive restricted graphical content. If the user makes no such selection, than processing can proceed to step 490 where the current presentation and user interface can be retained. Conversely, if, at step 450, the user does select an obscured version of a particular filter graphical content, such as a particular obscured image, then processing can proceed to step 460. At step 460, the user can be presented with a notification, such as the notification described in detail above with reference to FIG. 2, that can explain to the user why certain responsive graphical content has been presented in an obscured manner and can provide a mechanism by which the content limitation settings, which require that responsive graphical content to be presented in an obscured manner, can be changed. At step 470, a determination can be made as to whether the user agreed to change the content limitation settings. If, at step 470, it is determined that the user did not agree to change the content limitation settings, then processing can proceed to step 490 and the existing user interface can be retained with the removal of the notification that was presented at step 460. Conversely, if, at step 470, it is determined that the user did agree to change the content limitations, then processing can proceed to step 480 and the content limitation settings can be changed and, consequently, non-obscured versions of the responsive restricted graphical content, which was previously presented in an obscured manner, can be presented.

Figure 5:
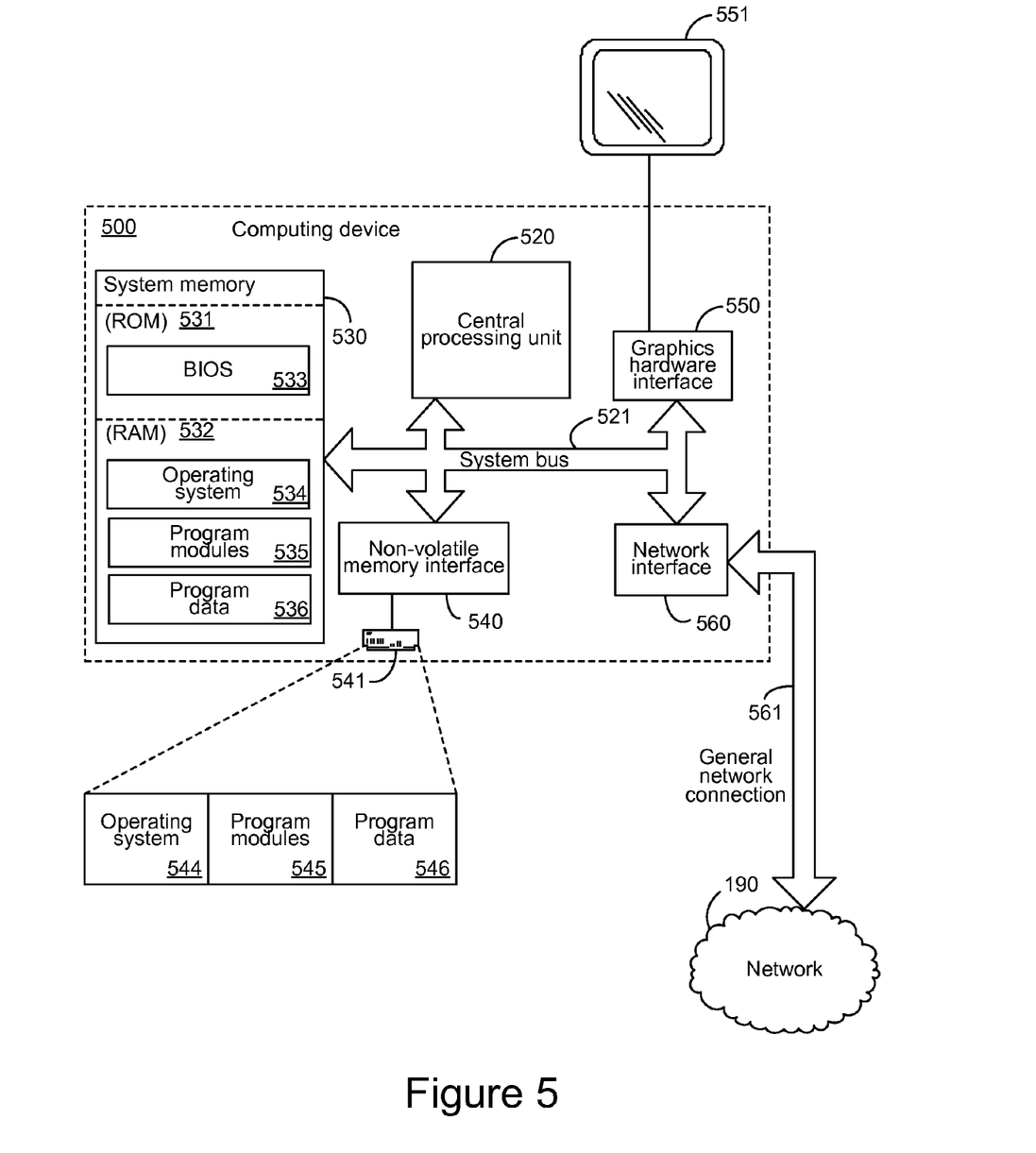
FIG. 5 is a block diagram of an exemplary computing device.

Turning to FIG. 5, an exemplary computing device 500 is illustrated. The exemplary computing device 500 can be any one or more of the computing devices referenced above, such as those illustrated in FIG. 1, including, for example, the computing devices 110 and 140, whose operation was described in detail above. The exemplary computing device 500 of FIG. 5 can include, but is not limited to, one or more central processing units (CPUs) 520, a system memory 530, that can include RAM 532, and a system bus 521 that couples various system components including the system memory to the processing unit 520. The system bus 521 may be any of several types of bus structures including a memory bus or memory controller, a peripheral bus, and a local bus using any of a variety of bus architectures. The computing device 500 can optionally include graphics hardware, such as for the display of obscured content in the situations described in detail above. The graphics hardware can include, but is not limited to, a graphics hardware interface 550 and a display device 551. Depending on the specific physical implementation, one or more of the CPUs 520, the system memory 530 and other components of the computing device 500 can be physically co-located, such as on a single chip. In such a case, some or all of the system bus 521 can be nothing more than silicon pathways within a single chip structure and its illustration in FIG. 5 can be nothing more than notational convenience for the purpose of illustration.

The computing device 500 also typically includes computer readable media, which can include any available media that can be accessed by computing device 500 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 500. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and the aforementioned RAM 532. A basic input/output system 533 (BIOS), containing the basic routines that help to transfer information between elements within computing device 500, such as during start-up, is typically stored in ROM 531. RAM 532 typically contains data and/or program modules that are immediately accessible to and/or presently being operated on by processing unit 520. By way of example, and not limitation, FIG. 5 illustrates the operating system 534 along with other program modules 535, and program data 536, which can include the above referenced network browser.

The computing device 500 may also include other removable/non-removable, volatile/nonvolatile computer storage media. By way of example only, FIG. 5 illustrates the hard disk drive 541 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540.

The drives and their associated computer storage media discussed above and illustrated in FIG. 5, provide storage of computer readable instructions, data structures, program modules and other data for the computing device 500. In FIG. 5, for example, hard disk drive 541 is illustrated as storing operating system 544, other program modules 545, and program data 546. Note that these components can either be the same as or different from operating system 534, other program modules 535 and program data 536. Operating system 544, other program modules 545 and program data 546 are given different numbers hereto illustrate that, at a minimum, they are different copies.

The computing device 500 can operate in a networked environment using logical connections to one or more remote computers. The computing device 500 is illustrated as being connected to a general network connection 561 through a network interface or adapter 560 which is, in turn, connected to the system bus 521. In a networked environment, program modules depicted relative to the computing device 500, or portions or peripherals thereof, may be stored in the memory of one or more other computing devices that are communicatively coupled to the computing device 500 through the general network connection 561. It will be appreciated that the network connections shown are exemplary and other means of establishing a communications link between computing devices may be used.

As can be seen from the above, mechanisms for providing accurate search results while honoring associated content limitations have been presented. In view of the many possible variations of the subject matter described herein, we claim as our invention all such embodiments as may come within the scope of the following claims and equivalents thereto.

We claim:

1. One or more computer-readable memory storage media comprising computer-executable instructions for generating search results while honoring content limitations, the computer-executable instructions directed to steps comprising:
   receiving a search query and the content limitations;
   identifying a first responsive content, hosted by a first remote computing device, as being responsive to the search query, the identified first responsive content being content which the content limitations proscribe from presenting in response to the search query;
   identifying a second responsive content, hosted by a second remote computing device, as being responsive to the search query, the identified second responsive content being content which the content limitations allow to be presented in response to the search query;
   generating an obscured version of a first thumbnail image representing the identified first responsive content, the generated obscured version of the first thumbnail image lacking those aspects of the identified first responsive content that are restricted by the content limitations; and
   providing a, in response to the search query, the response comprising: the generated obscured version of the first thumbnail image, a first link to the first responsive content on the first remote computing device, a second thumbnail image representing the second responsive content, and a second link to the second responsive content on the second remote computing device, and a textual indication of a third responsive content, responsive to the search query, the textual indication comprising a link to a third remote computing device hosting the responsive content and a selected textual portion of the third responsive content, the response causing simultaneous presentation of both the first and second thumbnail images, the response causing the first thumbnail image to be presented in a delineated visual area that is separate and apart from the textual indication of the third responsive content;
   wherein the first thumbnail image is associated with the first link such that user action directed to the first thumbnail image initiates a request for the first responsive content as identified by the first link; and
   wherein the second thumbnail image is associated with the second link such that user action directed to the second thumbnail image initiates a request for the second responsive content as identified by the second link.

2. The computer-readable memory storage media of claim 1, wherein the computer-executable instructions for generating the obscured version comprise computer-executable instructions for eliminating graphical details so as to render unrecognizable those aspects of the first responsive content represented in the first thumbnail image that cause the first responsive content to be restricted by the content limitations.

3. The computer-readable memory storage media of claim 2, wherein the computer-executable instructions for eliminating graphical details comprise computer-executable instructions for either: adjusting an alpha value of pixels of the first thumbnail image to modify the first thumbnail image such that it appears as if the first thumbnail image is being viewed through glass; or randomly changing positions of the pixels of the first thumbnail such that it appears as if the first thumbnail image is being viewed through frosted glass.

4. The computer-readable memory storage media of claim 1, comprising further computer-executable instructions for providing, in response to the search query, computer-executable instructions for presenting a notification if a user action is directed to the generated obscured version of the first thumbnail image, the notification comprising an indication that the content limitations proscribe presentation of an unobscured version of the first responsive content.

5. The computer-readable memory storage media of claim 4, wherein the notification further comprises a user-selectable option to change the content limitations so as to allow presentation of the unobscured version of the first responsive content.

6. The computer-readable memory storage media of claim 1, comprising further computer-executable instructions for assigning a value to the received search query, the assigned value quantifying an extent to which the received search query is directed to restricted content which the content limitations proscribe from presenting in response to the search query.

7. The computer-readable memory storage media of claim 6, wherein the identifying the first responsive content comprises searching a restricted content store only if the value assigned to the search query is above a threshold indicating that there is a restricted content aspect to the search query; wherein the restricted content store comprises content which the content limitations proscribe from presenting in response to the search query.

8. A method for providing search results while honoring content limitations, the method comprising the steps of:
receiving a search query and the content limitations;
identifying a first responsive content, hosted by a first remote computing devices, as being responsive to the search query, the identified first responsive content being content which the content limitations proscribe from presenting in response to the search query;
identifying a second responsive content, hosted by a second remote computing device, as being responsive to the search query, the identified second responsive content being content which the content limitations allow to be presented in response to the search query;
generating an obscured version of a first thumbnail image representing the identified first responsive restricted content, the generated obscured version of the first thumbnail image lacking those aspects of the identified first responsive content that are restricted by the content limitations; and
providing a, in response to the search query, the response comprising: the generated obscured version of the first thumbnail image, a first link to the first responsive content on the first remote computing device, a second thumbnail image representing the second responsive content, and a second link to the second responsive content on the second remote computing device, and a textual indication of a third responsive content, responsive to the search query, the textual indication comprising a link to a third remote computing device hosting the responsive content and a selected textual portion of the third responsive content, the response causing simultaneous presentation of both the first and second thumbnail images, the response causing the first thumbnail image to be presented in a delineated visual area that is separate and apart from the textual indication of the third responsive content;
wherein the first thumbnail image is associated with the first link such that user action directed to the first thumbnail image initiates a request for the first responsive content as identified by the first link; and
wherein the second thumbnail image is associated with the second link such that user action directed to the second thumbnail image initiates a request for the second responsive content as identified by the second link.

9. The method of claim 8, wherein the generating the obscured versions comprises eliminating graphical details so as to render unrecognizable those aspects of the first responsive content represented in the first thumbnail image that cause the first responsive content to be restricted by the content limitations.

10. The method of claim 9, wherein the eliminating graphical details comprises either: adjusting an alpha value of pixels of the first thumbnail image to modify the first thumbnail image such that it appears as if the first thumbnail image is being viewed through glass; or randomly changing positions of the pixels of the first thumbnail image such that it appears as if the first thumbnail image is being viewed through frosted glass.

11. The method of claim 8, further comprising the steps of:
providing, in response to the search query, computer-executable instructions for presenting a notification if a user action is directed to the generated obscured version of the first thumbnail image, the notification comprising an indication that the content limitations proscribe presentation of an unobscured version of the first responsive content.

12. The method of claim 11, wherein the notification further comprises a user-selectable option to change the content limitations so as to allow presentation of the unobscured version of the first responsive content.

13. The method of claim 8, further comprising the steps of:
assigning a value to the received search query, the assigned value quantifying an extent to which the received search query is directed to restricted content which the content limitations proscribe from presenting in response to the search query.

14. The method of claim 13, wherein the identifying the first responsive content comprises searching a restricted content store only if the value assigned to the search query is above a threshold indicating that there is a restricted content aspect to the search query; wherein the restricted content store comprises content which the content limitations proscribe from presenting in response to the search query.

15. A graphical user interface system comprising a display device communicationally coupled to a computing device, the display device having generated thereon a graphical user interface providing a user with search results while honoring content limitations, the user interface comprising:
a user-entered search query;

a second thumbnail image, presented in the user interface simultaneously with the second thumbnail image, the first thumbnail image representing a second responsive content, responsive to the search query, that is not restricted by the content limitations, the second responsive content being hosted by a second remote computing device; and a first thumbnail image representing a first responsive content, the first responsive content being responsive to the search query, but also being restricted by the content limitations, the first thumbnail image being an obscured version of at least a portion of the first responsive content, the obscuring causing the first thumbnail image to lack those aspects of the first responsive content that are restricted by the content limitations, the first responsive content being hosted by a first remote computing device; and a textual indication of a third responsive content, responsive to the search query, the textual indication comprising a link to a third remote computing device hosting the responsive content and a selected textual portion of the third responsive content;

wherein the first thumbnail image is presented in a delineated visual area of the user interface that is separate and apart from the textual indication of the third responsive content;

wherein the first thumbnail image is associated with a first link to the first responsive content such that user action directed to the first thumbnail image initiates a request for the first responsive content as identified by the first link; and wherein the second thumbnail image is associated with a second link to the second responsive content such that user action directed to the second thumbnail image initiates a request for the second responsive content as identified by the second link.

16. The graphical user interface system of claim 15, wherein the obscuring causes the first thumbnail image to lack graphical details such that those aspects of the first responsive content represented in the first thumbnail image that cause the first responsive content to be restricted by the content limitations are unrecognizable.

17. The graphical user interface system of claim 15, further comprising: a notification comprising: an indication that the content limitations proscribe presentation of the first responsive content; and a user-selectable option to change the content limitations so as to allow presentation of the first responsive content.

18. The graphical user interface system of claim 15, wherein the first thumbnail image comprises either: pixels with modified alpha values so that that it appears as if the representation of the first responsive content is being viewed through glass; or pixels with randomly changed positions so that that it appears as if the representation of the first responsive content is being viewed through frosted glass.

* * * * *